US012616879B1

(12) United States Patent
Bybee et al.

(10) Patent No.: US 12,616,879 B1
(45) Date of Patent: May 5, 2026

(54) COLLAPSIBLE GOLF BALL WASHER

(71) Applicants: Michael W. Bybee, Jurupa Valley, CA (US); Lizzette L. Bybee, Jurupa Valley, CA (US)

(72) Inventors: Michael W. Bybee, Jurupa Valley, CA (US); Lizzette L. Bybee, Jurupa Valley, CA (US)

(*) Notice: Subject to any disclaimer, the term of this patent is extended or adjusted under 35 U.S.C. 154(b) by 316 days.

(21) Appl. No.: 18/602,928

(22) Filed: Mar. 12, 2024

(51) Int. Cl.
*A63B 47/04* (2006.01)
*A63B 102/32* (2015.01)
*B08B 1/12* (2024.01)
*B08B 3/04* (2006.01)

(52) U.S. Cl.
CPC ................ *A63B 47/04* (2013.01); *B08B 1/12* (2024.01); *B08B 3/044* (2013.01); *A63B 2102/32* (2015.10); *A63B 2225/09* (2013.01); *A63B 2225/687* (2013.01)

(58) Field of Classification Search
CPC . A63B 47/04; A63B 2102/32; A63B 2225/09; A63B 2225/687; A63B 2200/3073; B08B 1/12; B08B 3/044
See application file for complete search history.

(56) References Cited

U.S. PATENT DOCUMENTS

| | | | |
|---|---|---|---|
| 3,101,497 A | 8/1963 | Derkocz | |
| 3,583,016 A | 6/1971 | McConnell | |
| 4,344,203 A | 8/1982 | Gerrick | |
| 5,555,586 A * | 9/1996 | Dorrich | A63B 47/04 15/21.2 |
| 5,572,761 A | 11/1996 | Meyer | |
| 10,058,744 B1 | 8/2018 | Yost | |
| 11,490,713 B2 | 11/2022 | Stewart-Stand et al. | |
| 2007/0147944 A1 | 6/2007 | Lockhart | |
| 2013/0015187 A1 | 1/2013 | Tate et al. | |
| 2019/0387906 A1 | 12/2019 | Cruickshank | |

* cited by examiner

*Primary Examiner* — Andrew A Horton
(74) *Attorney, Agent, or Firm* — Cramer Patent & Design, PLLC.; Aaron R. Cramer

(57) ABSTRACT

The disclosure pertains to a golf ball washer featuring a collapsible design for accommodating either one or two golf balls. It includes a corrugated sidewall with alternating rings and folds for easy expansion or collapse, internal scrubbers for debris removal, and a pre-cleaning brush. Additional functionalities encompass a retention loop for bag attachment, a lid to secure contents, and a pocket for ball marker storage. Constructed from durable materials like rubber and silicone, this portable device facilitates the convenient cleaning of golf balls on the course, aiming to enhance the golfing experience through improved maintenance and readiness of golf equipment.

10 Claims, 4 Drawing Sheets

COLLAPSIBLE GOLF BALL WASHER

RELATED APPLICATIONS

None.

FIELD OF THE DEVICE

The present device relates generally to a golf ball washer and more specifically to a golf ball washer that is collapsible.

BACKGROUND OF THE DEVICE

Golf, a sport enjoyed globally for its combination of skill, strategy, and engagement with the outdoors, necessitates the regular maintenance of equipment, including the cleanliness of golf balls for optimal performance. Traditional methods for cleaning golf balls have included manual brushes and stationary cleaning stations on golf courses, which may not always offer convenience or flexibility for players on the move.

The introduction of a collapsible golf ball washer addresses these challenges by providing a portable, efficient, and adaptable solution for golf ball maintenance. This device reflects an ongoing effort to enhance the practical aspects of golf accessories, focusing on the ease of maintaining clean golf balls for players at any location.

The collapsible golf ball washer features a design that allows it to adjust its capacity to clean either one or two golf balls, catering to the user's immediate needs. Its compact and portable nature is a significant improvement over traditional cleaning methods, offering golfers the ability to carry a personal cleaning device that adapts to different situations on the golf course or at the driving range.

The device is comprised of a golf ball container with a corrugated sidewall that expands or collapses, facilitating volume adjustment. This feature is coupled with a series of internal scrubbers and a designated brush, ensuring the removal of common debris such as dirt, sand, mud, and grass from the golf balls. The design also includes practical features like a retention loop for attachment to a golf bag, a lid to secure the balls and solution, and a pocket for a ball marker. Materials such as rubber and silicone are used in its construction to ensure durability and weather resistance.

Overall, the collapsible golf ball washer is designed with the aim of improving the golfing experience by providing a convenient, effective solution for golf ball maintenance. Its development is indicative of the evolving landscape of golf accessories, focusing on addressing the real-world needs of golfers with an emphasis on functionality and convenience.

SUMMARY OF THE DEVICE

In order to overcome the defects of the existing golf ball washers, the instant device provides a collapsible golf ball washer comprising a golf ball container with a side wall, a bottom wall, and a lid. In some embodiments, the side wall forms a hollow cylindrical tube that is sealed at one end by the bottom wall and capable of being covered at the opposite end by the lid. The side wall includes a plurality of rings and a plurality of folds, with the rings and folds alternating to enable the golf ball container to expand and collapse. This design allows for configurations suitable for holding either a single golf ball or a pair of golf balls.

Furthermore, embodiments may feature a brush designed to remove debris from a golf ball before it is placed into the golf ball container. A plurality of scrubbers, located within the golf ball container, cleans the golf ball when it is positioned inside the container, regardless of whether the container is in an expanded or collapsed configuration.

Additional embodiments include a retention loop attached to the exterior surface of the side wall for detachably coupling the golf ball container to an object, such as a golf bag. A ball marker pocket, situated at the bottom wall of the golf ball container, provides storage for a ball marker. In some embodiments, the lid is configured to cover the golf ball container and retain a cleaning solution within when in place, featuring a lip that secures over the top aperture of the golf ball container.

An attachment strap may tether the lid to the golf ball container. In some embodiments, the brush, which includes a brush handle and a plurality of bristles, is retained to the lid by a brush lanyard and can be stored within the golf ball container when not in use.

In certain embodiments, the side wall's plurality of rings are rectangular toroidal rings aligned around a central vertical axis. The plurality of folds are made of a material thinner than that of the rings, allowing the folds to deform and enable the expansion and collapse of the golf ball container. An individual fold includes an upper fold segment and a lower fold segment, with the top of the upper fold segment coupled to a ring located above the fold, and the bottom of the lower fold segment coupled to a ring located below the fold. This design facilitates movement of the fold segments towards and away from the center of the golf ball container as it collapses and expands, respectively.

The plurality of scrubbers, which may be bristles projecting inward from the interior side of one or more of the plurality of rings, are operable to clean the golf ball as it is inserted into and removed from the golf ball container. In some embodiments, the retention loop is positioned at the topmost of the plurality of rings on the side wall and is configured to facilitate attachment of the golf ball container to a golf bag or similar object via a retainer clip.

Materials for the golf ball container, the lid, and the attachment strap may include natural rubber, synthetic rubber, silicone, and neoprene. A brush loop, located on the interior surface of the lid, serves as an attachment point for the brush lanyard, ensuring that the brush remains connected to the golf ball washer when not in use.

The brush's plurality of bristles is oriented to be parallel to each other and projects perpendicularly away from one end of the brush handle, designed to effectively remove large debris from the golf ball or the face of a golf club before the golf ball is placed into the golf ball container.

Embodiments may specify dimensions for the golf ball container in both expanded and collapsed configurations to accommodate a pair of golf balls or a single golf ball, respectively, with precise measurements ensuring compatibility with standard golf balls.

A method of using the collapsible golf ball washer may include the steps of initially cleaning a soiled golf ball with the brush to remove debris, placing the cleaned golf ball into the golf ball container, adding a cleaning solution to the container, securing the lid over the container, manually shaking the container to further clean the golf ball with the plurality of scrubbers and the cleaning solution, adjusting the container's size as needed, and storing a ball marker in the ball marker pocket located at the bottom of the golf ball container.

BRIEF DESCRIPTION OF THE DRAWINGS

The advantages and features of the present device will become better understood with reference to the following more detailed description and claims taken in conjunction with the accompanying drawings, in which like elements are identified with like symbols, and in which:

DESCRIPTIVE KEY

Figure 1:
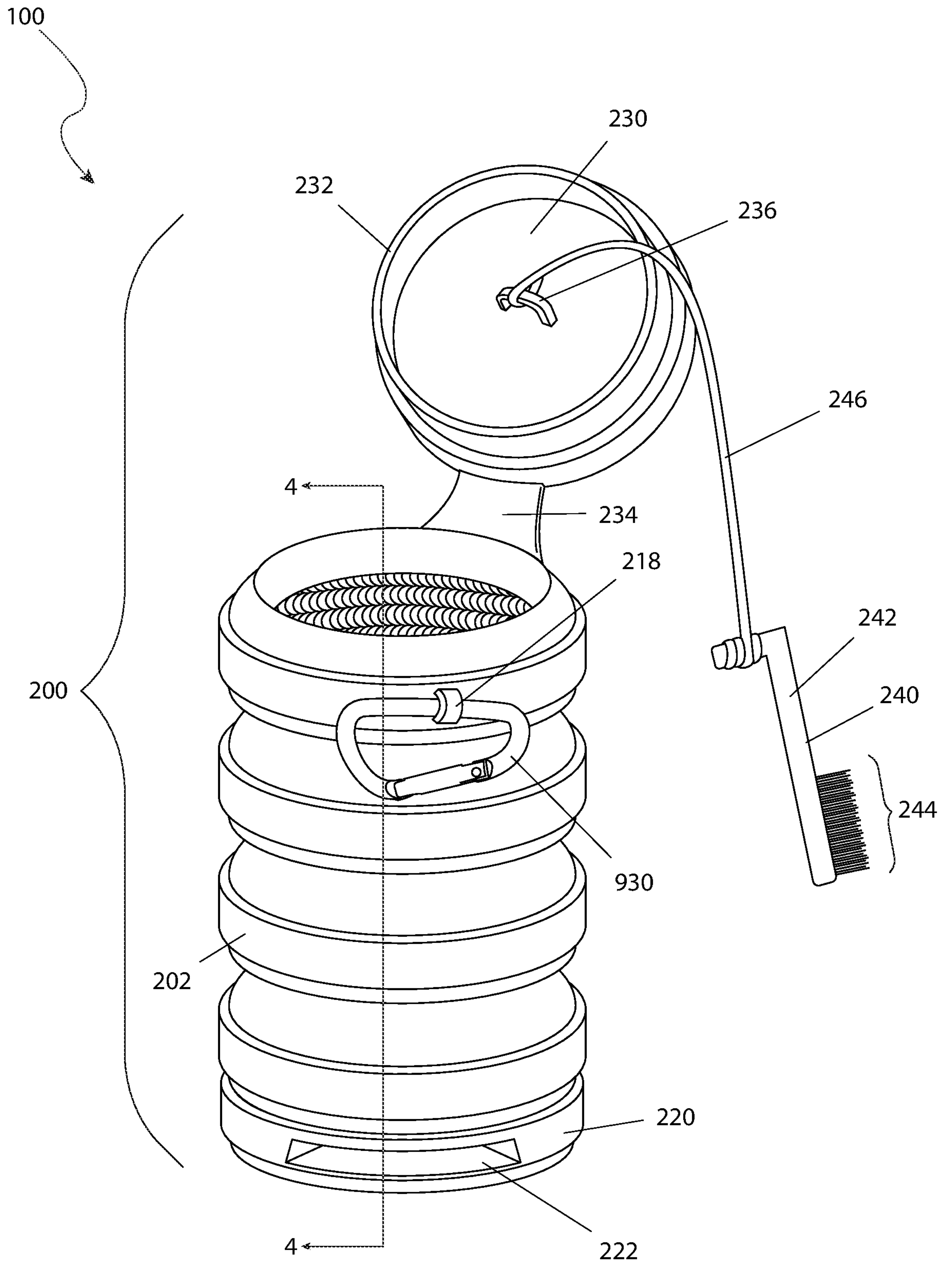
FIG. 1 is an isometric view of a collapsible golf ball washer 100, according to an embodiment of the present device.
Figure 3:
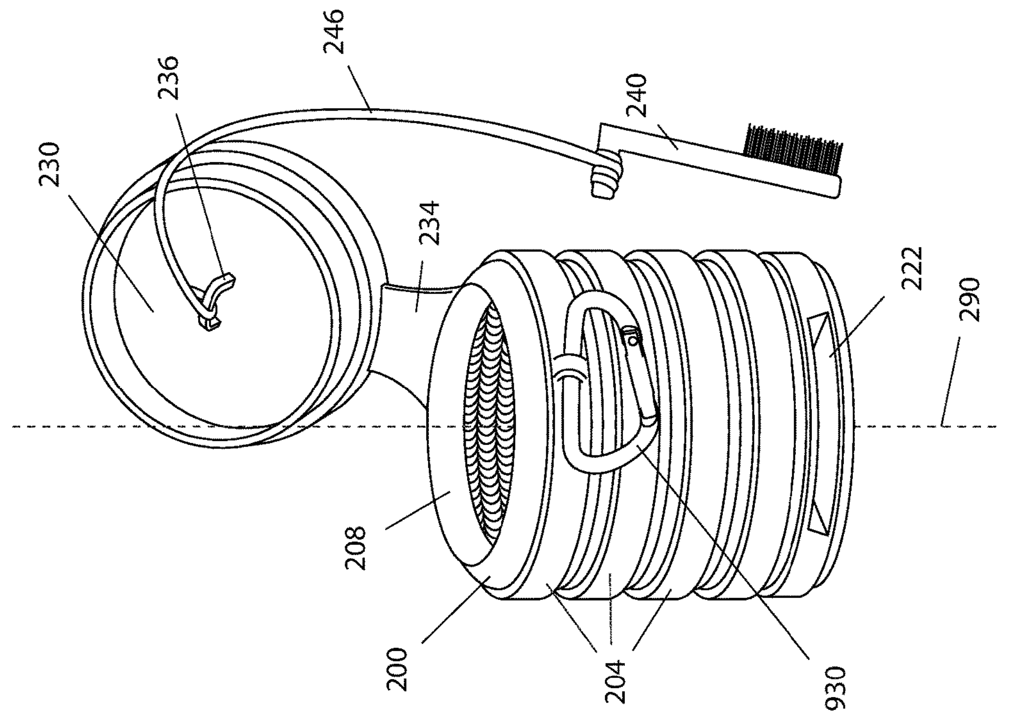
FIG. 3 is an isometric view of a collapsible golf ball washer 100, according to an embodiment of the present device, illustrating the golf ball container 200 collapsed to hold a single golf balls.
Figure 2:
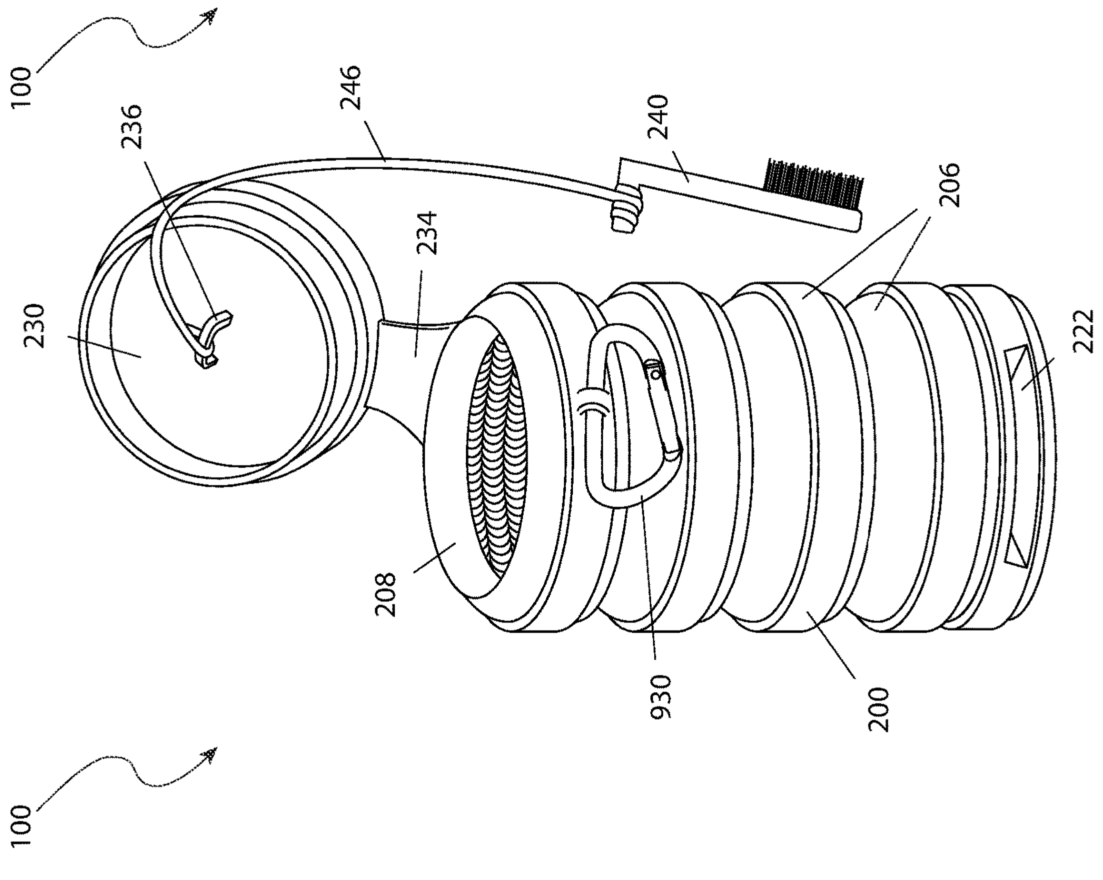
FIG. 2 is an isometric view of a collapsible golf ball washer 100, according to an embodiment of the present device, illustrating the golf ball container 200 expanded to hold a pair of golf balls.
Figure 4:
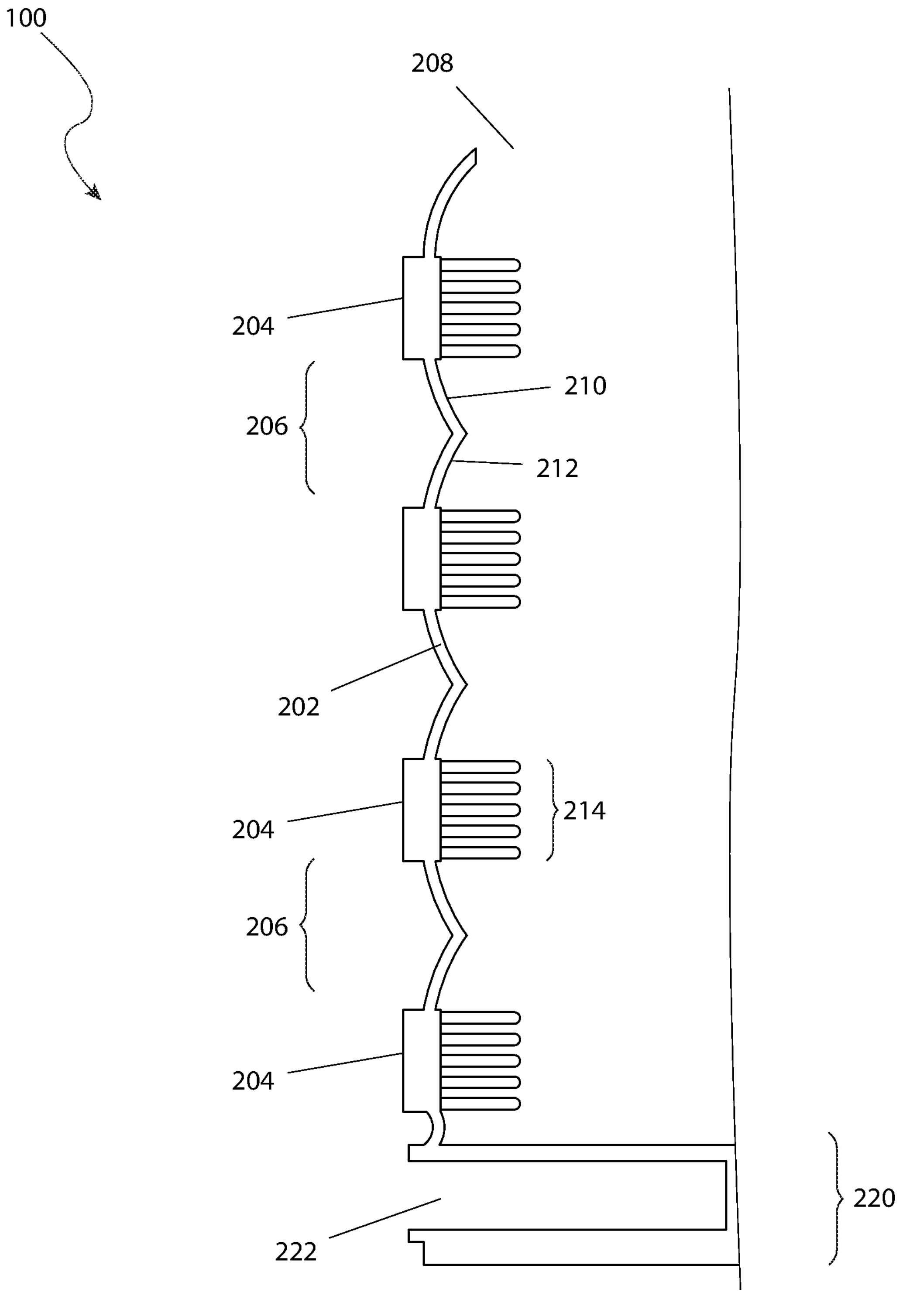
FIG. 4 is a cross-sectional view of a collapsible golf ball washer 100, according to an embodiment of the present device, across 4-4 as shown in FIG. 1; and, FIG. 5 is an in-use view of a collapsible golf ball washer 100, according to an embodiment of the present device.
Figure 5:
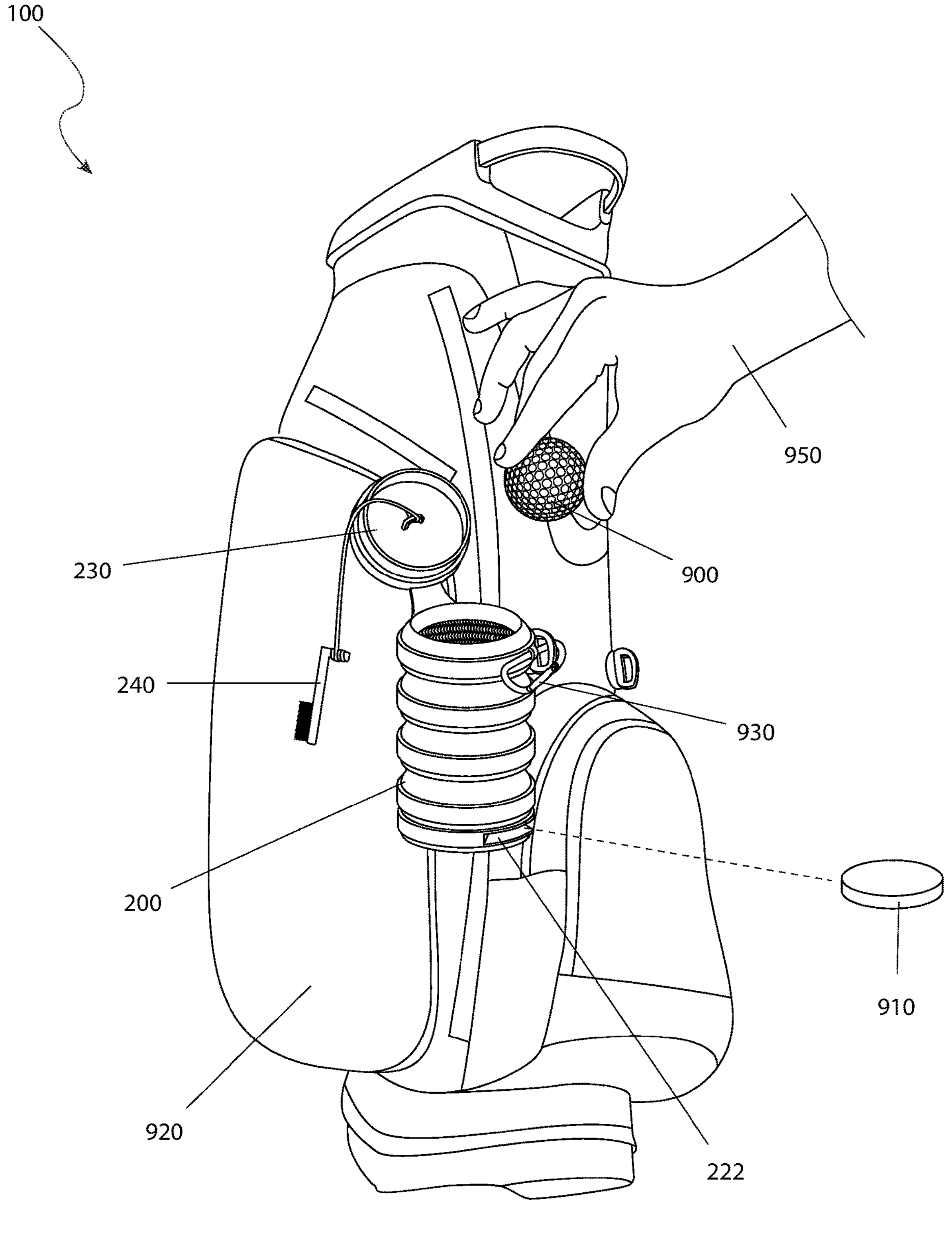

100 collapsible golf ball washer
200 golf ball container
202 side wall
204 plurality of rings
206 plurality of folds
208 top aperture
210 upper fold segment
212 lower fold segment
214 plurality of scrubbers
218 retention loop
220 bottom wall
222 ball marker pocket
230 lid
232 lip
234 attachment strap
236 brush loop
240 brush
242 brush handle
244 plurality of bristles
246 brush lanyard
290 central vertical axis
900 golf ball
910 ball marker
920 golf bag
930 retainer clip
950 golfer Description of the Device The present device is directed to a collapsible golf ball washer (herein described as the "device") 100. The collapsible golf ball washer 100 may comprise a golf ball container 200 and a brush 240. The collapsible golf ball washer 100 may be operable to clean a golf ball 900 or a pair of golf balls. The golf ball container 200 may be expanded to hold the pair of golf balls and collapsed to hold a single golf ball. The brush 240 may be adapted to be held by a golfer 950 and may be operable to remove debris from the golf balls 900 prior to placing the golf balls 900 into the golf ball container 200. The golf balls 900 may be further cleaned within the golf ball container 200 by soaking in a cleaning solution and by action of a plurality of scrubbers 214 located within the golf ball container 200. As non-limiting examples, the debris may comprise dirt, sand, mud, grass, or any combination thereof.

The golf ball container 200 may comprise a side wall 202, a bottom wall 220, and a lid 230. The side wall 202 may form a hollow cylindrical tube. The bottom of the hollow cylindrical tube may be sealed by the bottom wall 220. The top of the hollow cylindrical tube may comprise a top aperture 208 through which the golf balls 900 may be inserted into and removed from the golf ball container 200.

The side wall 202 may be corrugated such that the golf ball container 200 may expand and collapse. Specifically, the side wall 202 may comprise a plurality of rings 204 and a plurality of folds 206. The plurality of rings 204 and the plurality of folds 206 may alternate such that the plurality of rings 204 are separated by the plurality of folds 206. The plurality of rings 204 may be coupled to the plurality of folds 206.

An individual ring selected from the plurality of rings 204 may be a rectangular toroidal ring. The plurality of rings 204 may be aligned around a central vertical axis 290.

An individual fold selected from the plurality of folds 206 may comprise material that is thinner than the individual ring such that the plurality of folds 206 may deform to collapse and expand the golf ball container 200 while the plurality of rings 204 retain the rectangular toroidal ring shape while the golf ball container 200 expands and collapses.

The individual fold may comprise an upper fold segment 210 and a lower fold segment 212. The top of the upper fold segment 210 may be coupled to the individual ring located above the individual fold. The bottom of the lower fold segment 212 may be coupled to the individual ring located below the individual fold. The bottom of the upper fold segment 210 may be coupled to the top of the lower fold segment 212. The junction of the upper fold segment 210 and the lower fold segment 212 may move towards the center of the golf ball container 200 as the golf ball container 200 is collapsed and may move away from the center of the golf ball container 200 as the golf ball container 200 is expanded.

The interior side of one or more of the plurality of rings 204 may comprise the plurality of scrubbers 214. The plurality of scrubbers 214 may be operable to clean the golf balls 900 by brushing the golf balls 900 as the golf balls 900 are inserted into and removed from the golf ball container 200. The plurality of scrubbers 214 may further clean the golf balls 900 with the lid 230 in place as the golf ball container 200 is shaken during movement or shaken manually by the golfer 950. As non-limiting examples, the plurality of scrubbers 214 may comprise bristles projecting inward from the plurality of rings 204.

In addition to being brushed by the plurality of scrubbers 214, the golf balls 900 may be cleaned by virtue of soaking in the cleaning solution that may reside within the golf ball container 200. As non-limiting examples, the cleaning solution may comprise water, vinegar, baking soda, bleach, hydrogen peroxide, sodium percarbonate, or any combination thereof.

The exterior surface of the side wall 202 may comprise a retention loop 218. The retention loop 218 may be operable to detachably couple the golf ball container 200 to a golf bag 920 or other object via a retainer clip 930. As a non-limiting example, the retention loop 218 may be a carabiner. In a preferred embodiment, the retention loop 218 may be coupled to the topmost of the plurality of rings 204.

The bottom wall 220 may comprise a ball marker pocket 222. The ball marker pocket 222 may be operable to store a ball marker 910. The ball marker pocket 222 may be oriented to hold the ball marker 910 horizontally at the bottom of the golf ball container 200.

The lid 230 may be operable to cover the top aperture 208 in order to retain the golf balls 900 and the cleaning solution. A lip 232 of the lid 230 may comprise a diameter that is larger than the outside diameter of the golf ball container 200 such that the lid 230 may fit over the top of the golf ball container 200. The lid 230 may be tethered to the golf ball container 200 via an attachment strap 234.

As non-limiting examples, the golf ball container 200, the lid 230, and the attachment strap 234 may be made from natural rubber, synthetic rubber, silicone, neoprene, or any combination thereof.

The top interior surface of the lid 230 may comprise a brush loop 236. The brush loop 236 may be an attachment point for a brush lanyard 246.

The brush 240 may be a tool for removing any large debris from the golf ball 900 or the face of a golf club before placing the golf ball 900 into the golf ball container 200. The brush 240 may comprise a brush handle 242 and a plurality of bristles 244. The plurality of bristles 244 may project perpendicularly away from the brush handle 242 at one (1) end of the brush handle 242. The plurality of bristles 244 may be oriented to be parallel to each other. The brush 240 may be retained to the lid 230 by the brush lanyard 246. The brush 240 may fit within the golf ball container 200 when not in use.

In a preferred embodiment, the outside diameter of the golf ball container 200 may be two and five-eighths inches with an error of one-eighth of an inch (2⅝+/−⅛ in.). The inside diameter of the golf ball container 200 may be two and one-half inches with an error of one-eighth of an inch (2½+/−⅛ in.). The height of the golf ball container 200 may be six inches with an error of one-quarter of an inch (6+/−¼ in.) in the expanded configuration and four inches with an error of one-quarter of an inch (4+/−¼ in.) in the collapsed configuration. The brush 240 may be two and one-half inches with an error of one-eighth of an inch (2½+/−⅛ in.) long and one-quarter of an inch with an error of one-sixteenth of an inch (¼+/−1/16 in.) wide. The plurality of bristles 244 may extend along three-quarters of an inch with an error of one-sixteenth of an inch (¾+/−1/16 in.) of the brush handle 242. The brush lanyard 246 may be six inches with an error of one-half of an inch (6+/−½ in.) long. The width of the ball marker pocket 222 may be one and one-half inch with an error of one-sixteenth of an inch (1½+/−1/16 in.) and the depth of the ball marker pocket 222 may be one and one-half inch with an error of one-sixteenth of an inch (1½+/−1/16 in.).

In use, a cleaning solution may be poured into the golf ball container 200, the lid 230 may be coupled to the top of the golf ball container 200, and the golf ball container 200 may be clipped to the top of a golf bag 920 using a retainer clip 930 such as a carabiner. A golf ball 900 that has become soiled may be initially cleaned using the brush 240 to remove debris and the golf ball 900 may be placed into the golf ball container 200. A plurality of scrubbers 214 located within the golf ball container 200 and the cleaning solution held within the golf ball container 200 may further clean the golf ball 900. The golf ball container 200 may be expanded by stretching the side wall 202 of the golf ball container 200 such that the golf ball container 200 may hold a pair of golf balls. The golf ball container 200 may be collapsed by pressing the lid 230 towards the bottom wall 220 with the golf balls 900 removed. A ball marker 910 may be stored in the ball marker pocket 222 located at the bottom of the golf ball container 200.

The exact specifications, materials used, and method of use of the collapsible golf ball washer 100 may vary upon manufacturing. The foregoing descriptions of specific embodiments of the present device have been presented for purposes of illustration and description. They are not intended to be exhaustive or to limit the device to the precise forms disclosed, and obviously many modifications and variations are possible in light of the above teaching. The embodiments were chosen and described in order to best explain the principles of the device and its practical application, to thereby enable others skilled in the art to best utilize the device and various embodiments with various modifications as are suited to the particular use contemplated.

What is claimed is:

1. A collapsible golf ball washer comprising:

a golf ball container having a side wall, a bottom wall, and a lid, wherein the side wall forms a hollow cylindrical tube sealed at one end by the bottom wall and capable of being covered at the opposite end by the lid;

the side wall comprising a plurality of rings and a plurality of folds, where the plurality of rings and the plurality of folds alternate, enabling the golf ball container to expand and collapse between configurations for holding a single golf ball and a pair of golf balls;

a brush operable to remove debris from a golf ball prior to placing the golf ball into the golf ball container;

a plurality of scrubbers located within the golf ball container for cleaning the golf ball when the golf ball is placed within the golf ball container and the container is in either an expanded or collapsed configuration;

a retention loop attached to an exterior surface of the side wall for detachably coupling the golf ball container to an object;

a ball marker pocket located at the bottom wall of the golf ball container for storing a ball marker;

the lid configured to cover the golf ball container and retain a cleaning solution within the golf ball container when in place, the lid having a lip to secure over a top aperture of the golf ball container; and, an attachment strap tethering the lid to the golf ball container; and, wherein the brush comprising a brush handle and a plurality of bristles is retained to the lid by a brush lanyard; and, wherein the brush is configured to be storable within the golf ball container when the brush is not in use.

2. The collapsible golf ball washer of claim 1, wherein the side wall's plurality of rings are rectangular toroidal rings aligned around a central vertical axis, and the plurality of folds are made of a material thinner than the material of the plurality of rings, allowing the folds to deform to enable the expansion and collapse of the golf ball container.

3. The collapsible golf ball washer of claim 2, wherein an individual fold comprises an upper fold segment and a lower fold segment, a top of the upper fold segment being coupled to a ring located above the fold, and the bottom of the lower fold segment being coupled to a ring located below the fold, facilitating a movement of the fold segments towards and away from the center of the golf ball container as it collapses and expands, respectively.

4. The collapsible golf ball washer of claim 1, wherein the plurality of scrubbers are bristles projecting inward from an interior side of one or more of the plurality of rings, operable to clean the golf ball as it is inserted into and removed from the golf ball container.

5. The collapsible golf ball washer of claim 1, wherein the retention loop is positioned at the topmost of the plurality of rings on the side wall, and is configured to facilitate attachment of the golf ball container to a golf bag or similar object via a retainer clip.

6. The collapsible golf ball washer of claim 1, wherein the golf ball container, the lid, and the attachment strap include one or more of a natural rubber, a synthetic rubber, a silicone, and a neoprene.

7. The collapsible golf ball washer of claim 1, further comprising:

a brush loop located on an interior surface of the lid serving as an attachment point for the brush lanyard, thereby ensuring that the brush remains connected to the golf ball washer when not in use.

8. The collapsible golf ball washer of claim 1, wherein the brush's plurality of bristles are oriented to be parallel to each other and project perpendicularly away from one end of the brush handle, designed to effectively remove large debris from the golf ball or a face of a golf club before the golf ball is placed into the golf ball container.

9. The collapsible golf ball washer of claim 1, wherein a set of dimensions of the golf ball container, in the expanded configuration, are configured to specifically accommodate a pair of golf balls, and in the collapsed configuration, to snugly fit a single golf ball, with precise measurements provided to ensure compatibility with standard golf balls.

10. A method of using the collapsible golf ball washer of claim 1, comprising the steps of:

initially cleaning a soiled golf ball with the brush to remove debris;

placing the cleaned golf ball into the golf ball container;

adding a cleaning solution to the golf ball container;

securing the lid over the golf ball container;

shaking the golf ball container manually to further clean the golf ball with the plurality of scrubbers and the cleaning solution;

expanding the golf ball container to hold a pair of golf balls or collapsing it to hold a single golf ball as needed; and, storing a ball marker in the ball marker pocket located at the bottom of the golf ball container.

* * * * *